United States Patent [19]

Davidson et al.

[11] 4,289,591

[45] Sep. 15, 1981

[54] OXYGEN EVOLUTION WITH IMPROVED MN STABILIZED CATALYST

[75] Inventors: Craig R. Davidson, Hampstead, N.H.; John M. Sedlak, Andover, Mass.

[73] Assignee: General Electric Company, Wilmington, Mass.

[21] Appl. No.: 145,955

[22] Filed: May 2, 1980

[51] Int. Cl.³ .................. C25B 1/10; C25B 1/16; C25B 11/08; C25B 11/16

[52] U.S. Cl. .................. 204/129; 204/98; 204/282; 204/291

[58] Field of Search ............ 204/98, 128, 129, 290 R, 204/290 F, 291

[56] References Cited

U.S. PATENT DOCUMENTS

| | | | |
|---|---|---|---|
| 3,134,697 | 5/1964 | Niedrach | 429/30 |
| 3,297,484 | 1/1967 | Niedrach | 429/41 |
| 3,711,385 | 1/1973 | Beer | 204/59 R |
| 3,751,296 | 8/1973 | Beer | 204/290 F X |
| 3,775,284 | 11/1973 | Bennett et al. | 204/290 F |
| 3,855,092 | 12/1974 | O'Leary | 204/128 |
| 3,992,271 | 11/1976 | Danzig et al. | 204/129 |
| 4,039,409 | 8/1977 | La Conti et al. | 204/129 |
| 4,072,585 | 2/1978 | Bianchi et al. | 204/98 |
| 4,210,501 | 7/1980 | Dempsey et al. | 204/129 |
| 4,224,121 | 9/1980 | Dempsey et al. | 204/98 |

FOREIGN PATENT DOCUMENTS 1147442 4/1969 United Kingdom ............ 204/290 F

Primary Examiner—F. Edmundson
Attorney, Agent, or Firm—I. David Blumenfeld

[57] ABSTRACT

A gas generating apparatus and method is described which utilizes a novel catalytic oxygen evolving electrode for electrochemical systems, such as an electrolysis cell for the generation of oxygen. The electrochemical cells include a catalytic cathode and an improved catalytic anode positioned on opposite sides of, and bonded to, a solid polymer electrolyte membrane. A source of direct current potential between the cathode and the anode and means for removing gas from at least one of the electrodes are provided. The improved catalytic anode is an alloy of ruthenium oxide and manganese oxide. In one embodiment, oxygen is electrolytically generated by providing a catalytic cathode; providing a catalytic oxygen evolving anode wherein the oxygen evolving anode comprises ruthenium oxide and manganese oxide; positioning a solid polymer electrolyte ion transporting membrane between the cathode and the anode, the cathode being bonded to one surface of the membrane and the anode being bonded to the other surface of the membrane; and providing a direct potential between the cathode and the anode and supplying water to one of the electrodes to be acted on electrochemically to evolve oxygen at the anode. By adding the manganese oxide to the ruthenium oxide, the ruthenium oxide is stabilized, and there is substantial improvement in cell voltage in an electrolysis cell when the ruthenium oxide/manganese oxide catalyst material is used as an anode therein.

12 Claims, 4 Drawing Figures

OXYGEN EVOLUTION WITH IMPROVED MN STABILIZED CATALYST

This invention relates to methods and apparatus for the generation of gases, and more particularly, it relates to improved catalytic oxygen-evolving anodes for the generation of gases by electrolysis.

Electrochemical cells of the type utilizing an ion exchange membrane, otherwise known as, and designated herein as, a solid polymer electrolyte membrane or a solid polymer electrolyte ion transporting membrane, associated with a pair of catalytic electrodes have been described in the prior art in various forms and for various applications. In the present invention, the electrochemical cells are utilized for gas generation by electrolysis.

Various metals and metal alloys have been utilized as the catalytic electrodes in electrochemical cells. The performance of the catalyst at the gas evolving electrode (anode) is crucial in the effectiveness and efficiency of the electrochemical cell, and consequently, it is crucial in the economics of the gas evolving process. Such catalysts as platinum, platinum black, platinum-iridium alloy, a reduced alloy of platinum-ruthenium, and the like, have been used in the past as catalysts for these electrochemical cells. Ruthenium oxide catalyst material has been one of the best electrode catalyst materials reported to date because of its high oxygen evolution activity. However, the oxygen evolution activity of the ruthenium oxide decreases with time, and the susceptibility of ruthenium oxide to corrosion increases with time.

Electrochemical cells and methods for gas generation utilizing specific catalysts and electrodes are well-known in the prior art. In U.S. Pat. No. 3,992,271, an electrolysis and oxygen concentrating cell utilizing an oxygen evolving catalytic anode is described. The oxygen evolving catalytic anode utilizes a platinum-iridium alloy and provides improved performance and efficiency even though the use of such platinum-iridium alloys as electrodes in fuel cells had always resulted in poorer performance of the cell. However, the iridium, as well as the platinum, utilized as the alloying metals in the catalyst of U.S. Pat. No. 3,992,271 is quite expensive, and it was discovered in U.S. Pat. No. 4,039,409 that a reduced alloy of platinum and ruthenium containing about 5 to 60% ruthenium, had better performance than the reduced platinum-iridium alloy catalyst, and it was much less expensive to produce since the cost of ruthenium salts utilized to fabricate the platinum-ruthenium alloy was approximately one-half the cost of the iridium salts. Thus, in U.S. Pat. No. 4,039,409, there was provided a catalytic cathode and a gas evolving catalytic anode containing a reduced platinum-ruthenium alloy containing 5% to 60% by weight of ruthenium positioned on opposite faces of a cation exchange membrane. However, these alloys are vulnerable to the harsh effects of electrolysis reactions and oxygen gas, and consequently, they are not stable enough for prolonged use as anode materials in the electrolysis of water and other oxygenproducing media. Furthermore, the platinum moiety is rather expensive and less expensive materials are preferred for electrode materials.

Although these prior art gas generating and concentrating devices and processes work efficiently, it is always desirable to improve the efficiency of the devices and processes and at the same time reduce the cost of the devices and processes. Furthermore, it is always desirable to improve the resistance of the materials used in the electrochemical cells to the corrosion effects of chemicals, and especially to stabilize the gas generating anode against corrosion. Since these electrochemical gas generating devices utilize and/or generate acid media, there is a tendency of these acids (hydrogen ions or protons and other acid media) to corrode the catalysts, especially the catalysts used at the anode and thereby reduce the life of the device.

Stabilized electrocatalysts have been used as electrodes in processes and devices for the generation of chlorine by electrolysis of an aqueous alkali metal halide at the anode of an electrolysis cell which includes a solid polymer electrolyte in the form of a cation exchange membrane to separate the cell into catholyte and anolyte chambers. The catalytic electrodes at which the chlorine and caustic are produced are thin, porous, gas permeable catalytic electrodes which are bonded to opposite surfaces of the membrane so that the chlorine is generated at or near the membrane interface. To stabilize the electrode catalysts against the corrosive effects of chlorine, oxygen and other products and reactants normally present during electrolysis conditions, one or more reduced oxides of a valve metal such as titanium, tantalum, niobium, zirconium, hafnium, vanadium or tungsten are added to the reduced oxides of a platinum group metal such as platinum, palladium, iridium, rhodium, ruthenium and osmium. The prior art also teaches conventional cathode catalyst materials of finely-divided metals of platinum, palladium, gold, silver, spinels, manganese, cobalt, nickel, reduced platinum-group metal oxides (Pt-IrOx and Pt-RuOx), graphite and suitable combinations thereof. However, these materials are proposed as catalytic cathode materials in an electrochemical cell for the production of chlorine from brine. Furthermore, these metals are still subject to corrosive effects even when used in combinations, and it is desirable to improve the stability of gas generating anodes against the harsh conditions in electrochemical cells.

In British Pat. No. 1,147,442, chemically resistant non-film-forming materials are provided upon a core of a film-forming metal to make improved electrodes for electrolysis. The thin layer of non-film-forming materials which contact the electrolyte, are chemically resistant to the effect of the electrolyte and the products of the electrolysis. The non-film-forming materials include at least one oxide of a metal of the platinum group, i.e., an oxide of a metal taken from the group consisting of platinum, iridium, rhodium, palladium, ruthenium and osmium and alloys formed between these metals, or consists of a mixture of at least one oxide from the group consisting of manganese, lead, chromium, cobalt, iron, titanium, tantalum, zirconium and silicon. Although these materials may exhibit a degree of stability upon a metal core, most of the species are undesirable as electrode materials in electrochemical cells for the electrolysis of water or chlorine because they are inherently unstable by themselves in an acid media or because they do not contribute substantially to any improvement of the catalytic activity of ruthenium oxide as an electrode material. Furthermore, in most cases, when these materials are used as catalytic anodes in electrochemical cells which utilize a catalytic cathode and catalytic gas evolving anode in contact with a solid polymer electrolyte membrane for electrolysis of water or brine, cell voltage and cell efficiency, although acceptable initially, rapidly deteriorate within a short period of time.

The choice of catalyst in an electrochemical cell and its effectiveness in a given cell, depends upon a complex set of variables such as the surface area of a catalyst, availability of oxides of its species on the catalyst surface, contaminants in the reactant, and the nature of the conversion taking place in the cell. Consequently, it is and always has been difficult to predict the applicability of a catalyst useful in one electrochemical cell system to a different system. Even though one type of catalyst may produce advantageous results in one type of electrochemical cell system, it does not always follow that such an improvement wll be realized when the same catalyst is utilized in a different electrochemical cell system. As explained above, not only is it always desirable to improve the stability of the catalysts and other elements of the electrochemical cells, but it is also always desirable to improve the efficiencies of the electrochemical cells and the processes carried out therein.

It is, therefore, the primary object of the present invention to provide an improved method, apparatus and electrode for gas generation utilizing an improved electrocatalyst at the gas evolving electrode.

It is a further object of the present invention to provide an improved gas generation apparatus, process and electrode with which to produce gases by electrolysis by utilizing a catalyst which provides improved performance, improved stability and reduced cost.

Another object of this invention is to provide an anode, method and apparatus for producing oxygen by the electrolysis of media which evolve oxygen by electrolysis.

Still another object of the present invention is to provide an improved gas generation apparatus and a process for producing oxygen by electrolysis utilizing an improved, stable catalyst at the oxygen evolving anode.

Another object of the present invention is to provide an improved gas generation apparatus, method and anode for producing gases by electrolysis wherein there is little or no deterioration in cell voltage and cell efficiency within a short period of time.

Other objects and advantages of the invention will become apparent from the following description.

In accordance with the invention, oxygen is electrolytically generated by a method comprising:
(a) providing a catalytic cathode;
(b) providing a catalytic oxygen evolving anode;
(c) positioning a solid polymer electrolyte ion transporting membrane between the cathode and the anode, the cathode being bonded to one surface of the membrane and the anode being bonded to the other surface of the membrane; and,
(d) providing a direct potential between the cathode and the anode and supplying water to one of the electrodes to be acted on electrochemically to evolve oxygen at the anode,
the improvement comprising providing a catalyst at the oxygen evolving anode comprising ruthenium oxide and manganese oxide. By adding the manganese oxide to the ruthenium oxide, the ruthenium oxide is stabilized, and there is substantial improvement in cell voltage in an electrolysis cell when the ruthenium oxide/manganese oxide catalyst material is used as an anode therein.

In another aspect of the invention, there is provided a method for the production of oxygen by electrolysis comprising:
(a) continuously supplying a medium which evolves oxygen by electrolysis, to a catalytic oxygen evolving anode in an electrolytic cell wherein the catalytic oxygen evolving anode is separated from a catalytic cathode by a solid polymer electrolyte ion transporting membrane, and the catalytic oxygen evolving anode and the catalytic cathode are bonded to the respective surfaces of the solid polymer electrolyte ion transporting membrane, said oxygen evolving anode comprising a catalyst of ruthenium oxide and manganese oxide;
(b) continuously providing an aqueous medium to the catalytic cathode;
(c) supplying current to the anode and the cathode to electrolyze the medium which evolves oxygen at the anode; and,
(d) removing oxygen from the anode.

The electrode of the present invention for an electrolysis cell comprises a solid polymer electrolyte base member having two surfaces, the first surface having an anode catalyst material comprising ruthenium oxide and manganese oxide bonded thereto and a second surface having a cathode catalyst bonded thereto. It is the ruthenium oxide anode catalyst containing stabilizing amounts of manganese oxide which stabilizes the ruthenium oxide in the acid media and in the presence of the other harsh conditions which accompany electrolysis, without sacrificing the activity of the ruthenium oxide for evolution of oxygen gas.

These and various other objects, features and advantages of the invention can be best understood from the following description taken in conjunction with the accompanying drawings in which.

Figure 1:
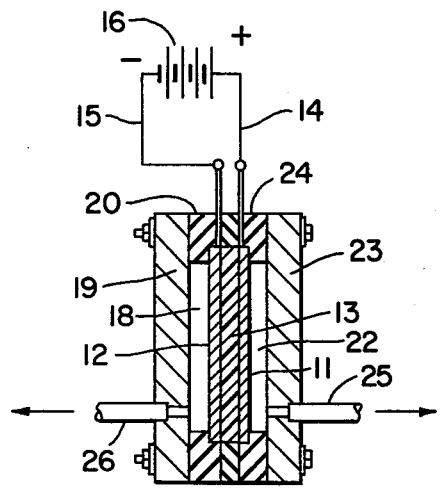
FIG. 1 is a sectional view of a gas generating apparatus for the production of gases, such as oxygen and hydrogen, by electrolysis which is capable of carrying out the process of the invention and which is constructed with the catalytic anode of the present invention.

The exemplary gas generation apparatus of FIG. 1 used to illustrate the catalytic anodes of the present invention is described in U.S. Pat. No. 4,039,409 and shown therein as FIG. 2.

Briefly, in FIG. 1, there is shown generally a gas generation apparatus in the form of an electrolysis cell embodying the invention and capable of carrying out the process of the present invention. The electrochemical cell is shown with catalytic anode 11 which comprises ruthenium oxide and manganese oxide, wherein the manganese oxide is completely dissolved in the ruthenium oxide phase. Solid polymer electrolyte ion transporting membrane 13 is bonded to anode 11 and catalytic cathode 12 is bonded to solid polymer electrolyte membrane 13 such that solid polymer electrolyte membrane 13 is positioned or interposed between anode 11 and cathode 12. Anode 11 and cathode 12 are bonded to membrane 13 so that they form an integral part of the respective surfaces of membrane 13. Electrical leads 14 and 15 are connected with electrodes 11 and 12 and to an external power source 16 shown in the form of a battery connected across the electrodes.

In the electrolysis cell of FIG. 1, oxygen anode chamber 22 (anolyte chamber) communicates with oxygen outlet 25 while hydrogen cathode chamber 18 (catholyte chamber) communicates with hydrogen outlet 26. In the operation of electrolysis cell of FIG. 1, a direct current potential is applied across catalytic anode 11 and catalytic cathode 12 from battery 16 while a hydrogen-containing compound or a medium which evolves oxygen and protons, such as water, aqueous sulfuric acid, aqueous sodium sulfate and deuterium oxide, is supplied at catalytic anode 11. The direct current applied across catalytic anode 11 and catalytic cathode 12 dissociates the medium at the anode to produce oxygen and protons (hydrogen ions). The hydrogen accumulates in catholyte chamber 18 and is removed through outlet 26 while oxygen accumulates in anolyte chamber 22 and is removed through outlet 25.

In the electrolysis cell of FIG. 1, a direct current potential is applied across the improved catalytic anode comprising ruthenium oxide and a stabilizing amount of manganese oxide and a catalytic cathode from the battery, and a hydrogen-containing or proton-containing compound such as water, for example, is supplied at the improved catalytic anode. The catalytic anode is preferably a catalyst comprising ruthenium oxide and a stabilizing amount of manganese oxide, for example, from about 5 weight percent to about 25 weight percent manganese oxide. Dissociation of the hydrogen containing or proton-containing compound at the catalytic anode results in molecular hydrogen gas (H$_2$) being produced at the catalytic cathode while oxygen gas is produced at the improved catalytic anode comprising ruthenium oxide and manganese oxide. With a cation exchange membrane as the solid polymer electrolyte ion transporting membrane, the reactions at the electrodes are as follows:

At the improved catalytic anode:

$$H_2O \rightarrow \tfrac{1}{2}O_2 + 2H^+ + 2e^-$$

At the catalytic cathode:

$$2H^+ + 2e^- \rightarrow H_2$$

In the electrolysis cell described above, the medium which evolves oxygen and protons, that is the hydrogen-containing or proton-containing compounds which also contain oxygen, for example, water, required to produce ions (protons) and oxygen, for example, by dissociation at the improved catalytic anode, is supplied through the catalytic anode by flooding the anode chamber (anolyte chamber) or through the use of wicking means and the like. This mode of supply of water or other media which evolve oxygen and protons, is preferred over a catholyte water feed. However, the electrolysis cell described above can function when the supply of water is through a catholyte water feed.

It has been found that an improved gas generation apparatus and an improved process for generating gas from a medium which evolves oxygen by electrolysis, for example, from water, is possible by utilizing an improved electrode comprising a solid polymer electrolyte base member having two surfaces, the first surface having an anode catalyst material comprising ruthenium oxide and manganese oxide bonded thereto and a second surface having a cathode catalyst bonded thereto, the ruthenium oxide and manganese oxide preferably being an alloy wherein the manganese oxide is completely dissolved in the ruthenium oxide phase of the alloy. The improved catalytic anode of this invention provides superior stability in the generation of oxygen from water by electrolysis. It has also been found that when the anode catalyst comprising ruthenium oxide is stabilized with manganese dioxide, and the composition is an alloy wherein manganese dioxide is completely dissolved in the ruthenium oxide, there is no sacrifice of the activity of the ruthenium oxide catalyst in performance in the electrolysis of water.

Although the invention has been illustrated above with reference to the specific electrolysis configuration shown in FIG. 1, it is to be understood that the present invention embracing an improved anode material for electrolytically generating oxygen with an anode catalyst at the oxygen evolving anode comprising ruthenium oxide and manganese oxide, may be used in other configurations for the electrolytic generation of oxygen in an electrolysis cell wherein an anode catalyst material comprising ruthenium oxide and manganese oxide is bonded to and forms an integral part of one surface of a solid polymer electrolyte base member and a cathode catalyst is bonded to and forms an integral part of the other surface of the solid polymer electrolyte base member.

A variety of ion exchange membranes may be used as the solid polymer electrolyte ion transporting membrane in the electrochemical cell. One such ion exchange membrane which functions very adequately is a perfluorocarbon sulfonic acid solid polymer electrolyte sold by E. I. Dupont deNemours and Company under the trade designation "NAFION."

One preferred ion exchange resin which is particularly useful as a solid polymer electrolyte ion transporting membrane in an electrochemical cell for electrolytically generating oxygen in accordance with the present invention is a cation exchange resin. Ion exchange membranes including the solid polymer electrolyte membranes which may be used in the present invention, are well known in the prior art and are described in various publications including U.S. Pat. No. 3,297,484.

Various catalytic materials such as platinum black, for example, may be utilized for the catalytic cathode. The catalytic electrodes, both cathode and anode, are customarily pressed into, embedded upon, mounted directly upon, or otherwise bonded to the surface of the ion exchange membrane, otherwise designated in the prior art as the solid polymer electrolyte ion transporting membrane. Catalytic cathodes and the methods of making catalytic electrodes are described in various publications including U.S. Pat. No. 3,297,484. The catalytic cathode and the solid polymer electrolyte membrane can be chosen by one skilled in the art and are not critical in the practice of the present invention. The catalytic electrodes are generally of the thin, porous, gas permeable type which are bonded to opposite surfaces of the solid polymer electrolyte membrane so that the gases are generated at or near the electrode-membrane interface.

In its broadest aspect, the improvement of the present invention is directed to the catalytic anode or catalytic oxygen evolving anode wherein the improvement comprises providing a catalyst comprising ruthenium oxide and manganese oxide as the anode bonded to the solid polymer electrolyte ion transporting membrane. In the preferred embodiment, the ruthenium oxide and the manganese oxide are an alloy, and the manganese oxide is completely dissolved in the ruthenium oxide in a concentration of about 5 weight percent to about 25 weight percent manganese oxide (based upon the weight of the ruthenium oxide). The ruthenium oxide may be generally designated as $RuO_2 \cdot H_2O$, and the manganese oxide may be generally designated as $MnO_2$.

It has been found that the anodes made in accordance with the present invention and containing the manganese oxide-stabilized ruthenium oxide catalyst material substantially extends the life of the catalytic anode in the generation of oxygen in an electrochemical cell of the type having a catalytic cathode; a catalytic oxygen evolving anode; a solid polymer electrolyte ion transporting membrane positioned between the cathode and the anode, the cathode and the anode being bonded to the respective surfaces of the membrane. Furthermore, it has been discovered that there is little or no sacrifice in cell performance when the preferred ruthenium oxide anode catalyst material is diluted with (stabilized with) stabilizing concentrations of manganese oxide in the form of an alloy wherein the manganese oxide is completely dissolved in the ruthenium oxide.

The concentration of the manganese oxide in the ruthenium oxide is critical in the practice of the present invention, and it has been discovered that the upper limit of manganese oxide which may be used to stabilize the ruthenium oxide, is that concentration of manganese oxide which completely dissolves in the ruthenium oxide phase to form a true metal solution. This is defined herein as the upper limit of the stabilizing amount of manganese oxide in the ruthenium oxide. In preferred embodiments, the manganese oxide is present in the ruthenium oxide in the stabilizing amounts of about 5% by weight to about 25% by weight, based upon the weight of the ruthenium oxide. In the most preferred embodiments, the concentration of the stabilizing amounts of manganese oxide in the ruthenium oxide is about 10% by weight to about 15% by weight manganese oxide, based upon the weight of the ruthenium oxide. Generally, the lower concentrations of manganese oxide, i.e., from about 5% by weight to about 15% by weight manganese oxide, are preferred because of the lower electrical resistivity of the ruthenium oxide-manganese oxide alloy having the lower concentrations of manganese oxide therein. Naturally, the lower the cell resistance, i.e., electrical resistivity, the greater the efficiency of the electrochemical cell. X-Ray diffraction studies carried out upon the catalyst comprising 90% ruthenium oxide and 10% manganese oxide (by weight) showed a uniform ruthenium oxide structure indicative of the fact that the manganese oxide is present in solid solution. Studies on stability of the anode catalyst of the present invention and oxygen evolution activity, reported below, showed only slight variations in cell potential over prolonged periods of operation in an electrochemical cell in which oxygen was prepared by the electrolysis of water using the anode catalyst of the present invention.

Other materials may also be included in the anode catalyst composition of the improved catalytic anode as long as the materials do not effect the performance or stability of the electrode in the processes and apparatus of the invention. For example, various binders and extenders which are well-known in the art may be used in the catalytic anode. Extenders are generally materials having good conductivity and may contribute to the stability, life, porosity, conductivity, and the like of the catalyst material. For example, in certain cases, it has been found advantageous to use a binder to bond the catalyst material, that is the ruthenium oxide-manganese oxide alloy to the solid polymer electrolyte ion transporting membrane. Binders are well-known in the art and include polytetrafluoroethylene particles which may be mixed with the alloy prior to fixing the material to the solid polymer electrolyte ion transporting membrane or prior to casting the catalytic electrode in the form of a decal, whichever technique is used to form the electrode and to bond it to the solid polymer electrolyte ion transporting membrane.

The ruthenium oxide-manganese oxide anode catalyst of the present invention may be made in any manner well-known in the art. In one preferred method, the catalytic alloy can be prepared by thermally decomposing the mixed metal salts of the compounds used in the alloy. This is generally referred to as the Adams method or the modified Adams method, and it is well-known in the prior art. The Adams method and modified Adams method are discussed and described in U.S. Pat. No. 4,039,409. A thermally decomposible ruthenium halide, such as ruthenium chloride, is added to an appropriate quantity of a manganese salt, such as manganese sulfate and an excess of sodium nitrate. Generally, it is convenient to mix the finely-divided halide salts of ruthenium and the salts of manganese in the same weight ratio of ruthenium and manganese desired in the final alloy. An excess of sodium nitrate is incorporated and the mixture is fused in a silica dish at 500° C. for 3 hours. The residue is then washed thoroughly to remove the soluble nitrate, halide salts or any other soluble salts present, leaving a residue of ruthenium oxide-manganese oxide. The resulting alloy is dried thoroughly as by the use of a heat lamp, followed by comminution to the appropriate particle size. The resulting product may be graded to size by an appropriate means, for example, the product may be sifted through sieves of the appropriate size, for example, a 400 mesh nylon screen. The resulting alloy of the two oxides is black in appearance. In certain cases, the Adams method or modified Adams method calls for the reduction of the alloy product to reduce or eliminate the oxides therein, for example, the products are reduced at room temperature by bubbling hydrogen therethrough or by using an electrochemical reduction technique, e.g., electrochemical reduction in acid media. However, in accordance with the present invention, the oxide forms of the alloy are preferred, and reduction of the oxide forms is not necessary. The Adams method and modified Adams method is also described in U.S. Pat. No. 3,992,271.

Any appropriate metal salts of ruthenium and metal salt of manganese may be used to produce the alloys of the present invention. The preferred salts have been discussed above. However, the sulfates, bromides, nitrates, iodides and any other common inorganic salt forms of the ruthenium and manganese can be used to prepare the alloys useful as anode catalysts in oxygen generation in accordance with the present invention. The resulting alloy may be calcined, if desired. Calcining sharpens the crystalline structure of the alloy and is optional in the preparation of the alloy of the present invention. Although the calcining sharpens the crystalline structure of the product, it does not appear to have any effect upon the stability of the anode or upon the efficiency of the gas generation.

Although the anode catalyst has been defined herein as comprising ruthenium oxide and manganese oxide, it is not meant to preclude the inclusion of ruthenium and/or manganese metals in the solid solution composition, and minor amounts of the metal in the non-oxide form may be present in the alloy composition without significantly impacting the stability of the anode catalyst or the cell efficiency. Accordingly, up to about 10% by weight of the ruthenium oxide-manganese oxide anode catalyst material may comprise the ruthenium metal and/or manganese metal in the free state (zero valence) or in the non-oxide state.

Anode and cathode current collectors well-known in the art may be used to engage the catalytic anode and the catalytic cathode respectively to make electrical contact therewith. The structure and composition of the current collectors is not critical in the practice of the present invention. Other features in the electrochemical cell are generally conventional and well-known in the prior art, exemplary of which are those features described in U.S. Pat. No. 3,992,271 and U.S. Pat. No. 4,039,409.

As explained above, the electrode may be formed from the ruthenium oxide-manganese oxide catalyst material alone by any suitable prior art method, or it may be used in conjunction with a binder to support the anode catalyst material. When "Teflon" is used as a binder, the electrode is formed as a "Teflon" bonded alloy mixture by blending the alloy catalyst material (made by the modified Adams method as described above or by some alternative technique), with a Teflon dispersion to produce the bonded electrode structure in the manner described in U.S. Pat. No. 3,297,484. In the process of bonding the electrode, the catalyst may be blended with Teflon dispersions in such a manner that the dispersion contains little or no hydrocarbons. This mode of fabrication is also discussed in U.S. Pat. No. 4,039,409 and is not critical in the practice of the present invention.

Although the invention is not to be limited to any particular theory, the following explanations may help to explain the stabilization of the ruthenium oxide by the manganese oxide. Corrosion investigations of ruthenium oxide and kinetic studies of oxygen evolution on ruthenium oxide point to valence changes in the ruthenium surface atoms in the course of oxygen electrocatalysis. Some of these valence states of ruthenium are unstable in acidic environments and undergo dissolution while others are inactive toward oxygen. Manganese (ultimately in the form of the oxide) is added to ruthenium oxide in a concentration of about 5% to about 25% by weight (metal content) to form a single phase of the oxides which posseses the activity for oxygen evolution approaching that of ruthenium oxide anode catalyst alone but having vastly increased stability. The manganese of the manganese oxide interacts with the ruthenium of the ruthenium oxides on an atomistic level to preclude the irreversible change of state of ruthenium and, therefore, the corrosion and loss of performance. Ruthenium metal is somewhat less stable than the other platinum group metals, and since the stability of the base metal is directly related to the stabilities of the surface oxides formed under different conditions, and since ruthenium anode catalyst material is composed of only oxides with no base metal present, the corrosion behavior of the anode catalyst material relates to the stability of the oxides of ruthenium. It has been established that the hydrated ruthenium oxide is stable in neutral and acid media below an applied potential of about 1.4 volts versus the reversible hydrogen electrode in the same medium and in the absence of complexing agents. When the voltage is increased above 1.4 volts, the hydrated ruthenium oxide ($RuO_2.H_2O$) undergoes oxidation to the ruthenates or perruthenates ($RuO_4^{2-}$ and $RuO_4^{-1}$ respectively) which most probably undergo decomposition at pH values less than 7.5 to the hydrated ruthenium oxide and a soluble ruthenium species, e.g., $H_2RuO_5$ where ruthenium is in the 8+ state. This oxidation of the hydrated ruthenium oxide takes place by proton transfer in the hydrated oxide layer. It is also known that ruthenium oxide can be stabilized for a short time by thermal treatments. This stabilization dehydrates the oxide lattice rendering it crystalline with the ruthenium oxide structure. In this condition, there is no mechanism for proton transfer in the oxide with the associated valence changes, thus maintaining ruthenium in the 4+ valence state and precluding bulk dissolution. However, this condition is not permanent and gradual hydration/oxidation at the surface lends this material unstable with time. In the course of oxygen or chlorine evolution on ruthenium oxide, the electrocatalytic activity of which is well-known, the anode potential approaches or surpasses the 1.4 volts corrosion potential. Hence, the corrosion takes place, and it is desirable to stabilize the ruthenium oxide. Manganese oxide has been found to stabilize the ruthenium oxide in the anode catalyst. In the pH and potential region of interest for oxygen and chlorine evolution, the pH region for oxygen generation generally being about 1.5 and the pH region for chlorine generally being somewhat alkaline up to about 10, manganese oxide is known to be stable. The ionic radius of the 4+ valence state of manganese differs by only 10% from that of the ruthenium 4+ valence state and that of manganese 3+ valence state differs only by 3% from that of ruthenium 4+ valence. Thus, the solid solution mixed oxides form a stabilized form of ruthenium oxide when stabilizing amounts of manganese are used with the ruthenium.

The following examples further illustrate the practice of the invention and they are meant to be exemplary only and are not to be construed as limiting the invention in any way.

EXAMPLE 1

To illustrate the ruthenium oxide-manganese oxide alloy used as the anode catalyst in the present invention, a 90% ruthenium oxide-10% manganese oxide (by weight) material was prepared by the modified Adams process discussed above, and an X-Ray diffraction pattern of the solid solution was studied before and after calcination.

Finely-divided ruthenium chloride and manganese sulfate were mixed in a ratio of 10 weight percent manganese sulfate and 90 weight percent ruthenium chloride (the same weight ratio of manganese and ruthenium desired in the final alloy), and an excess of sodium nitrate was incorporated in the mixture. The mixture was fused in a silica dish at 500° C. for 3 hours to form a molten liquid of the reaction products which were cooled and formed a solid block of the reaction products. The resulting product was comminuted and washed thoroughly with water to remove soluble products such as nitrates, halides and sulfates therefrom. The resulting product was then dried, and the sample was analyzed for its X-Ray diffraction pattern. The diffraction pattern is reported in Table 1 below.

TABLE 1
X-RAY* DIFFRACTION PATTERN OF
90% RUTHENIUM OXIDE-10% MANGANESE OXIDE

| | Uncalcined | | | Calcined | | |
|---|---|---|---|---|---|---|
| (hkl) | Region of Scan Pattern 2θ | Intensity of Pattern | Lattice Spacing d(A) | Region of Scan Pattern 2θ | Intensity of Pattern | Lattice Spacing d(A) |
| 110 | 28.2 | 100 | 3.16 | 27.7 | 57 | 3.22 |
| 101 | 35.3 | 100 | 2.542 | 34.9 | 46 | 2.571 |
| 200 | 40.1 | 37 | 2.248 | 39.8 | 16 | 2.264 |
| 111 | — | — | — | 40.5 | 8 | 2.227 |
| 210 | 45.1 | 5 | 2.010 | 44.9 | 2 | 2.018 |
| 211 | 54.6 | 100 | 1.680 | 54.2 | 45 | 1.692 |
| 220 | 58.1 | 40 | 1.588 | 57.9 | 14 | 1.593 |
| 002 | 59.7 | 18 | 1.549 | 59.5 | 4 | 1.554 |
| 310 | 65.8 | 30 | 1.420 | 65.5 | 9 | 1.425 |
| 112 | 67.4 | 27 | 1.390 | 67.0 | 7 | 1.397 |
| 301 | 69.8 | 35 | 1.347 | 69.6 | 11 | 1.351 |
| 202 | 74.5 | 8 | 1.274 | 74.1 | 4 | 1.280 |
| 321 | 83.7 | 18 | 1.156 | 83.6 | 5 | 1.157 |
| 400 | 86.8 | 6 | 1.122 | 86.7 | 2 | 1.123 |
| 222 | 88.0 | 12 | 1.110 | 88.2 | 3 | 1.108 |
| 330 | 93.8 | 6 | 1.056 | 93.3 | 2 | 1.060 |
| 312 | 94.8 | 12 | 1.048 | 94.7 | 3 | 1.048 |
| 411 | 97.2 | 15 | 1.028 | 97.1 | 3 | 1.029 |
| 420 | 100.2 | 9 | 1.005 | 100.2 | 2 | 1.005 |
| 213 | 114.3 | 5 | .919 | 114.0 | 2 | .920 |
| 402 | 116.3 | 9 | .907 | 115.8 | 1 | .9105 |
| 510 | 122.1 | 5 | .881 | 122.0 | 1 | .8820 |
| 332 | 123.9 | 7 | .874 | 123.6 | 1 | .8750 |
| 501 | 126.6 | 12 | .863 | 126.35 | 3 | .8640 |
| 303 | 130.2 | 5 | .850 | 130.0 | 2 | 851 |
| 422 | 132.4 | 10 | .843 | — | — | .844 |
| 521 | 146.6 | 8 | .805 | 132.0 | 2 | .805 |
| 323 | 152.2 | 6 | .794 | — | — | — |
| 440 | 153.3 | 6 | .793 | 152.2 | 2 | .794 |

*Using CuKα Radiation

The data from the scan as evidenced by the diffraction pattern shown in Table 1 below, indicates that the manganese oxide is completely dissolved in the ruthenium oxide phase. The X-Ray diffraction pattern before and after calcination was similar except for the increased sharpness in diffraction lines for the calcined ruthenium oxide-manganese oxide catalyst. From the diffraction pattern, it is concluded that the manganese oxide is present in the ruthenium oxide in solid solution.

EXAMPLE 2

To illustrate the operational characteristics of electrolysis cells utilizing the improved catalytic anodes of the invention and to show the excellent performance of the oxygen generation process and apparatus utilizing the ruthenium oxide-manganese oxide anode catalysts and the stability thereof, electrolysis cells similar to those of FIG. 1 were constructed having a solid polymer electrolyte ion transporting membrane with an area of 1/20 ft². The water electrolyzer was operated at 180° F. (82° C.).

Figure 2:
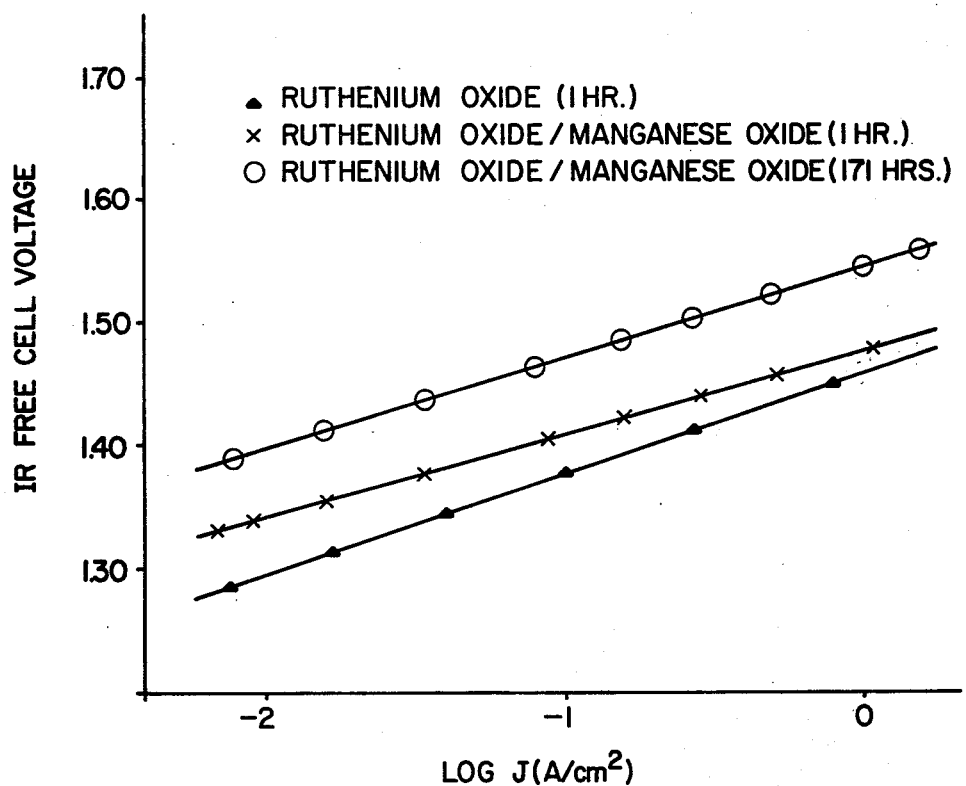
FIG. 2 is a graph comparing the performance (in cell potential in volts versus the log of the current density in amps per $cm^2$) of a prior art embodiment and the anode catalyst of the present invention.

The cathode catalyst of the electrolysis cells contained a platinum/graphite catalyst material. The solid polymer electrolyte membrane was a cation exchange membrane having electrodes with active areas of approximately 1/20 ft² operating in a flooded anode mode. The performance of two different electrolysis cells were compared, one cell having an anode with 90% ruthenium oxide-10% manganese oxide and the other having an anode of ruthenium oxide catalyst. The performance characteristics are shown in the graph of FIG. 2 wherein the cell potential in volts is plotted along the ordinate, and the log of the current density (log J) in amps/cm² is plotted along the abscissa. The data from the electrochemical cell for the electrolysis of water using a prior art ruthenium oxide anode catalyst is shown in the graph of FIG. 2 by the line connecting the triangles. The data represents the cell voltage after 1 hour of operation. The data for the electrolysis of water in an electrochemical cell having the ruthenium oxide-10% manganese oxide anode catalyst operation for 1 hour is represented by the line connecting the "X's" in the graph of FIG. 2. The data for the electrolysis of water in an electrochemical cell using the improved anode catalyst of the invention after operating for 171 hours is shown by the line connecting the circles ("O's") in the graph of FIG. 2. As indicated above, an anode made of ruthenium oxide alone begins to corrode (due to instability) at a cell voltage of 1.40. Furthermore, it was observed that the ruthenium oxide anode catalyst in an oxygen generation apparatus was sufficiently corroded so that it was substantially inoperable in the generation of oxygen by water electrolysis after 48 hours of operation. It can be seen from the graph in FIG. 2 that the most desirable results are obtained from the generation of oxygen by water electrolysis when the anode catalyst is ruthenium oxide alone. However, as indicated above, the ruthenium oxide anode catalyst is substantially inoperable after 48 hours of gas generation. When the ruthenium oxide-manganese oxide catalyst is used as the anode it can be seen that the cell voltage is somewhat increased, however, there are no substantial differences in cell voltage, and due to the prolonged operation of the cell when the anode catalyst is ruthenium oxide and manganese oxide solid solution, there is considerable advantage in using the catalyst of the present invention as the anode catalyst. It should be noted that the cell voltages in the graph of FIG. 2 are reported as the IR-free voltages.

EXAMPLE 3

Figure 3:
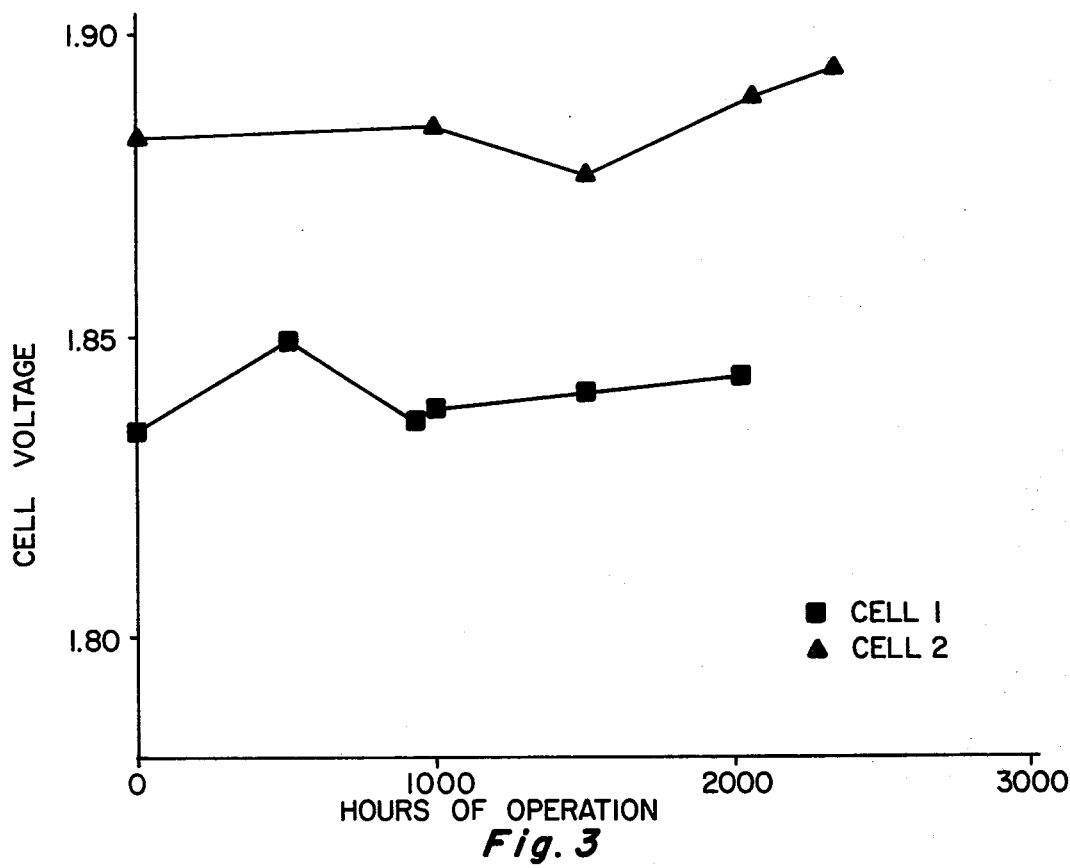
FIG. 3 is a graph illustrating the reproducibility of the stability of the anode catalysts of the present invention from cell to cell for oxygen evolution in cell potential (volts) versus hours of operation.
Figure 4:
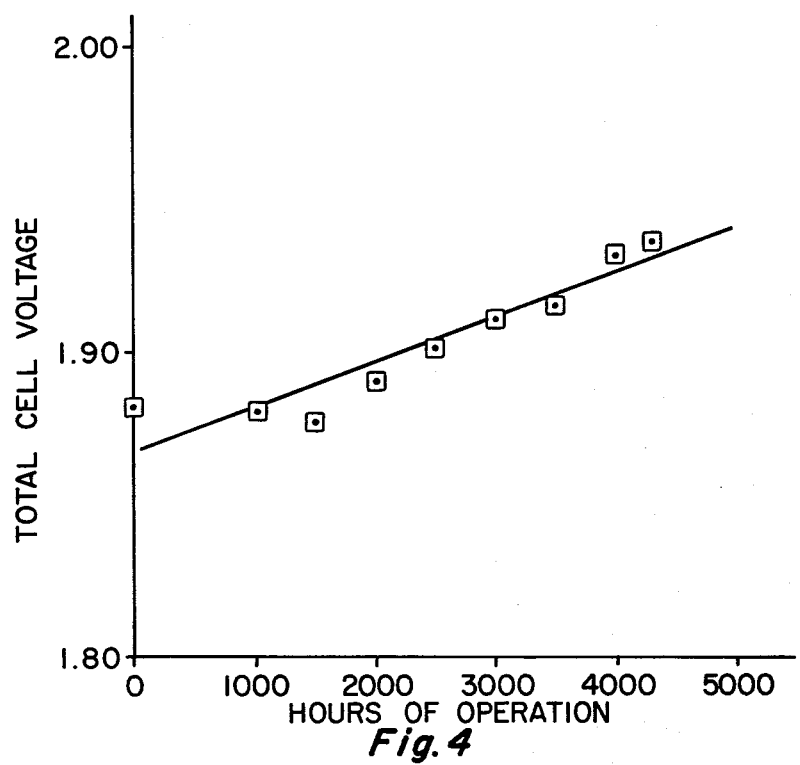
FIG. 4 is another graphical representation of the extended lift performance of a water electrolysis cell having the catalytic anode of the present invention in total cell potential (volts) versus hours of operation.

Two test cells similar to those described in Example 2 above were used to test the stability of 90% ruthenium-10% manganese anode catalyst in the electrolysis of water for the evolution of oxygen gas. The data from the tests is reported graphically in FIG. 3 wherein the cell voltage in volts at 1000 amps/ft² current density is reported in the ordinate and the number of hours of operation is reported in the abscissa of the graph. The cell voltage of FIG. 3 is reported as total cell voltage including the IR factor which includes the IR drops across the membrane and the current collector resistance. Curve 1 represents the operation of cell 1 and is illustrated in the graph by the line connecting the solid squares, and cell 2 is represented on the graph by the line connecting the solid triangles in FIG. 3. Cell 2 was operated at 180° F. (82° C.) for the entire run, and cell 1 was operated at 180° F. (82° C.) for the first 1000 hours and 240° F. (116° C.) for the second 1000 hours, i.e., from 1000 hours of operation to 2000 hours of operation. Voltage changes of about 5 microvolts per hour are relatively small and may be due in part to membrane contamination from cell water. The graphical representation in FIG. 3 shows that electrochemical cells for the electrolysis of water using the ruthenium oxide-manganese oxide catalyst of the present invention perform well even up to 2000 hours of operation in the generation of oxygen gas with little deterioration in cell performance with time. The test from cell 2 in FIG. 3 was continued for over 4000 hours. The results are reported in FIG. 4. The data in FIG. 4 shows acceptable performance of the electrochemical cell using the anode catalyst of this invention for more than 4000 hours.

EXAMPLE 4

Water was electrolyzed to produce oxygen in an electrochemical cell similar to the one described above in Example 2. The cell was operated at a current density of 100 amps/ft$^2$ and 180° F. (82° C.). The IR-free voltage is reported in Table 2 below wherein the voltage is reported at various time intervals. The data in Table 2 illustrates that there is very little change in cell performance with time when the ruthenium oxide catalyst stabilized with manganese oxide is used as an anode on a solid polymer electrolyte cation transporting membrane.

TABLE 2

CELL PERFORMANCE (IN IR-FREE CELL POTENTIAL)

| TIME (hours) | IR-FREE VOLTAGE |
| --- | --- |
| INITIAL (0) | 1.429 |
| 19.8 | 1.469 |
| 35.1 | 1.478 |
| 75.0 | 1.484 |
| 245.0 | 1.528 |
| 484.0 | 1.536 |
| 1684.0 | 1.542 |

It can be observed from the data in Table 2 that there was only a slight change of 0.014 volt (IR-free) in cell performance in over 1400 hours of operation, i.e., from 245 hours of operation up to 1,684 hours of operation. Thus, cell performance is exceptional when the stabilized anode catalyst material comprising ruthenium oxide and manganese oxide is used in the generation of oxygen by water electrolysis.

EXAMPLE 5

Two samples were prepared for X-ray diffraction studies as described in Example 1 above. One sample contained 95% ruthenium oxide-5% manganese oxide and the corresponding amounts of ruthenium chloride and manganese sulfate were used in conjunction with an excess amount of sodium nitrate to make the alloy. The X-ray diffraction data from the 95% ruthenium oxide-5% manganese oxide solid solution are reported in Table 3 below. The other sample contained 75% ruthenium oxide-25% manganese oxide and was prepared by using the corresponding amounts of ruthenium chloride and manganese sulfate in conjunction with an excess of sodium nitrate. The X-ray diffraction pattern for this sample containing 75% ruthenium oxide-25% manganese oxide is reported in Table 4 below.

TABLE 3

X-RAY* DIFFRACTION PATTERN OF UNCALCINED 95% RUTHENIUM OXIDE-5% MANGANESE OXIDE

| Region of Scan Pattern 2θ° | Intensity of Pattern | Lattice Spacing d(A) | Corresponds to Lattice Spacing of |
| --- | --- | --- | --- |
| 14.7 | 2 | 6.03 | Manganese Oxide (MnO$_2$ ?) |
| 22.4 | 3 | 3.96 | |
| 28.0 | 100 | 3.18 | RuO$_2$ |
| 35.3 | 90 | 2.542 | RuO$_2$ |
| 40.3 | 22 | 2.237 | RuO$_2$ |
| 54.4 | 60 | 1.686 | RuO$_2$ |
| 57.9 | 17 | 1.593 | RuO$_2$ |
| 59.8 | 8 | 1.546 | RuO$_2$ |
| 67.4 | 15 | 1.390 | RuO$_2$ |
| 69.8 | 15 | 1.347 | RuO$_2$ |
| 74.3 | 5 | 1.277 | RuO$_2$ |
| 83.4 | 10 | 1.159 | RuO$_2$ |
| 87.9 | 9 | 1.111 | RuO$_2$ |
| 95.6 | 10 | 1.041 | RuO$_2$ |
| 99.8 | 9 | 1.008 | RuO$_2$ |
| 114.8 | 8 | 0.915 | RuO$_2$ |
| 125.6 | 10 | 0.866 | RuO$_2$ |
| 130.4 | 8 | 0.849 | RuO$_2$ |
| 149.4 | 6 | 0.800 | RuO$_2$ |

*Using CuKα RADIATION

According to the data in Table 3 for the sample of 95% ruthenium oxide-5% manganese oxide, a strong ruthenium oxide phase predominates the sample. The sample also showed the presence of some weak diffraction peaks in the low angle region which are probably manganese oxide (MnO$_2$). These are shown in Table 3 followed by a question mark.

TABLE 4

X-RAY* DIFFRACTION PATTERN OF UNCALCINED 75% RUTHENIUM OXIDE-25% MANGANESE OXIDE

| REGION OF SCAN PATTERN 2θ° | INTENSITY OF PATTERN | LATTICE SPACING d(A) | CORRESPONDS TO LATTICE SPACING OF |
| --- | --- | --- | --- |
| 14.2 | 3 | 6.24 | Manganese Oxide (MnO$_2$ ?) |
| 20.6 | 4 | 4.31 | |
| 22.4 | 8 | 3.96 | |
| 27.8 | 90 | 3.21 | RuO$_2$ |
| 35.0 | 53 | 2.564 | RuO$_2$ |
| 35.7 | 35 | 2.515 | Alloy |
| 40.0 | 15 | 2.253 | RuO$_2$ |
| 41.5 | 10 | 2.175 | Alloy |
| 54.2 | 50 | 1.692 | RuO$_2$ |
| 55.4 | 31 | 1.658 | Alloy |
| 57.9 | 14 | 1.593 | RuO$_2$ |
| 59.4 | 6 | 1.556 | Alloy |
| 65.4 | 6 | 1.428 | RuO$_2$ |
| 66.9 | 10 | 1.399 | RuO$_2$ |
| 69.5 | 15 | 1.352 | RuO$_2$ |
| 74.3 | 4 | 1.277 | RuO$_2$ |
| 83.5 | 7 | 1.158 | RuO$_2$ |
| 96.9 | 6 | 1.030 | RuO$_2$ |
| 100.1 | 6 | 1.006 | RuO$_2$ |

+Weak lines
*Using CuKα RADIATION

The data of Table 4 indicates the predominance of a strong ruthenium oxide phase. Table 4 which represents the catalyst comprising 75% ruthenium oxide-25% manganese oxide showed the formation of a fairly strong second phase. This second phase does not correspond to any manganese oxide phases, but could be an alloy of ruthenium oxide/manganese oxide or a tetragonal phase with a slight lattice parameter shift. The sample 75% ruthenium oxide-25% manganese oxide also shows the presence of some weak diffraction peaks in the low angle region which probably represent manganese oxide (MnO$_2$). Cetain other weak lines were also present but are not reported in Table 4.

EXAMPLE 6

Tests were conducted upon various anode catalysts made from 75% ruthenium oxide and 25% of representative elements in IV-B, V-B and VI-B of the Periodic Chart of the Elements. The catalysts were made in accordance with the modified Adams process discussed above and described in Example 1 above by using the halide salts (chlorides) or other suitable salts of the particular metal. The catalysts containing 75% ruthenium oxide and 25% of the oxide of zirconium, niobium, tantalum, tungsten, titanium or hafnium, were used as anode catalysts in a cell similar to that shown in FIG. 1 and as described in Example 2 at a current density of 1000 amps/ft$^2$ and a cell temperature of 180° F. (82° C.). The data from the electrochemical cells for the electrolysis of water is reported in Table 5 below.

TABLE 5
CELL PERFORMANCE USING ANODE CATALYSTS CONTAINING 75% RUTHENIUM OXIDE-25% VALVE METAL OXIDE

| ANODES CATALYST | CELL VOLTAGE AT 1000 AMPS/ft$^2$ | | |
|---|---|---|---|
| | Start | 24 Hours | 48 Hours |
| 75% Ruthenium Oxide/25% Zirconium Oxide | 1.745 | 1.952 | 2.780 |
| 75% Ruthenium Oxide/25% Niobium Oxide | 1.801 | 1.854 | 2.130 |
| 75% Ruthenium Oxide/25% Tantalum Oxide | 1.766 | 1.888 | 2.610 |
| 75% Ruthenium Oxide/25% Tungsten Oxide | 1.757 | 1.926 | 2.600 |
| 75% Ruthenium Oxide/25% Titanium Oxide | 1.828 | 2.28 | — |
| 75% Ruthenium Oxide/25% Hafnium Oxide | 1.813 | 2.27 | — |

Cell performance, as represented by cell voltage in volts, was suitable for each of the anode catalyts in Table 5 at the initial start-up of the electrolysis of water. However, after 24 hours of continuous operation of the cell, cell performance substantially deteriorated using the anode catalyst containing 75% ruthenium oxide-25% titanium oxide and containing 75% ruthenium-25% hafnium oxide. After 48 hours of continuous operation, cell performance for the remaining anode catalyst materials had substantially deteriorated as evidenced by the high cell voltage. Thus, none of these anode catalyst materials reported in Table 5 had acceptable stability.

The data demonstrates that cheaper oxygen generating catalytic anodes can be prepared and operated in electrolysis cells for the electrolysis of water substantially as efficiently as the prior art catalytic oxygen evolving anodes. By this invention, it is now possible to obtain the advantages of gas generation by the electrolysis of water with ruthenium oxide anode catalyst materials without incurring the disadvantage of corrosion normally encountered when the ruthenium oxide catalyst material is utilized as an anode in an electrochemical cell. An improved electrocatalyst has been demonstrated as a gas evolving electrode, and oxygen has been produced by the electrolysis of water utilizing an improved anode catalyst having substantially greater stability than the preferred prior art anode catalyst materials. By using the ruthenium oxide-manganese oxide catalyst of this invention, there is little or no deterioration in cell voltage or cell efficiency over relatively long periods of cell operation, and there is little or no corrosion or deterioration of the anode catalyst over substantially long periods of electrochemical activity.

While other modifications of the invention and variations thereof which may be employed within the scope of the invention, have not been described, the invention is intended to include such modifications as may be embraced within the following claims.

What is claimed is:

1. In a method for electrolytically generating oxygen comprising:
   (a) providing a catalytic cathode;
   (b) providing a catalytic oxygen evolving anode;
   (c) positioning a solid polymer electrolyte ion transporting membrane between the cathode and the anode, the cathode being bonded to one surface of the membrane and the anode being bonded to the other surface of the membrane; and,
   (d) providing a direct potential between the cathode and the anode and supplying water to one of the electrodes to be acted on electrochemically to evolve oxygen at the anode;
   the improvement comprising providing a catalyst at the oxygen evolving anode comprising ruthenium oxide and manganese oxide.

2. The method of claim 1 wherein the anode comprises about 5 weight percent to about 25 weight percent manganese oxide.

3. The method of claim 1 wherein the solid polymer electrolyte ion transporting membrane comprises a cation exchange resin.

4. The method of claim 1 wherein the ruthenium oxide and manganese oxide of the anode catalyst is a solid solution.

5. The method of claim 1 wherein the catalyst at the anode further comprises a filler or a binder.

6. The method of claim 5 wherein the filler or binder is a fluorocarbon polymer.

7. A method for the production of oxygen by electrolysis comprising:
   (a) continuously supplying a medium which evolves oxygen by electrolysis to a catalytic oxygen evolving anode in an electrolytic cell wherein the catalytic oxygen evolving anode is separated from a catalytic cathode by a solid polymer electrolyte ion transporting membrane, and the catalytic oxygen evolving anode and the catalytic cathode are bonded to the surfaces of the solid polymer electrolyte ion transporting membrane, said oxygen evolving anode comprising a catalyst of ruthenium oxide and manganese oxide;
   (b) continuously providing an aqueous medium to the catalytic cathode;
   (c) supplying current to the anode and the cathode to electrolyze the medium which evolves oxygen, at the anode; and,
   (d) removing oxygen from the anode.

8. The method of claim 7 wherein the anode comprises about 5 weight percent to about 25 weight percent manganese oxide.

9. The method of claim 7 wherein the solid polymer electrolyte ion transporting membrane comprises a cation exchange membrane.

10. The method of claim 7 wherein the oxygen evolving anode catalyst further comprises an inert filler or binder.

11. The method of claim 10 wherein the inert filler or binder is a fluorocarbon polymer.

12. The method of claim 7 wherein the ruthenium oxide and manganese oxide of the anode catalyst is a solid solution.

* * * * *